M. TIBBETTS.
VEHICLE WHEEL.
APPLICATION FILED OCT. 21, 1914.
1,330,222. Patented Feb. 10, 1920.
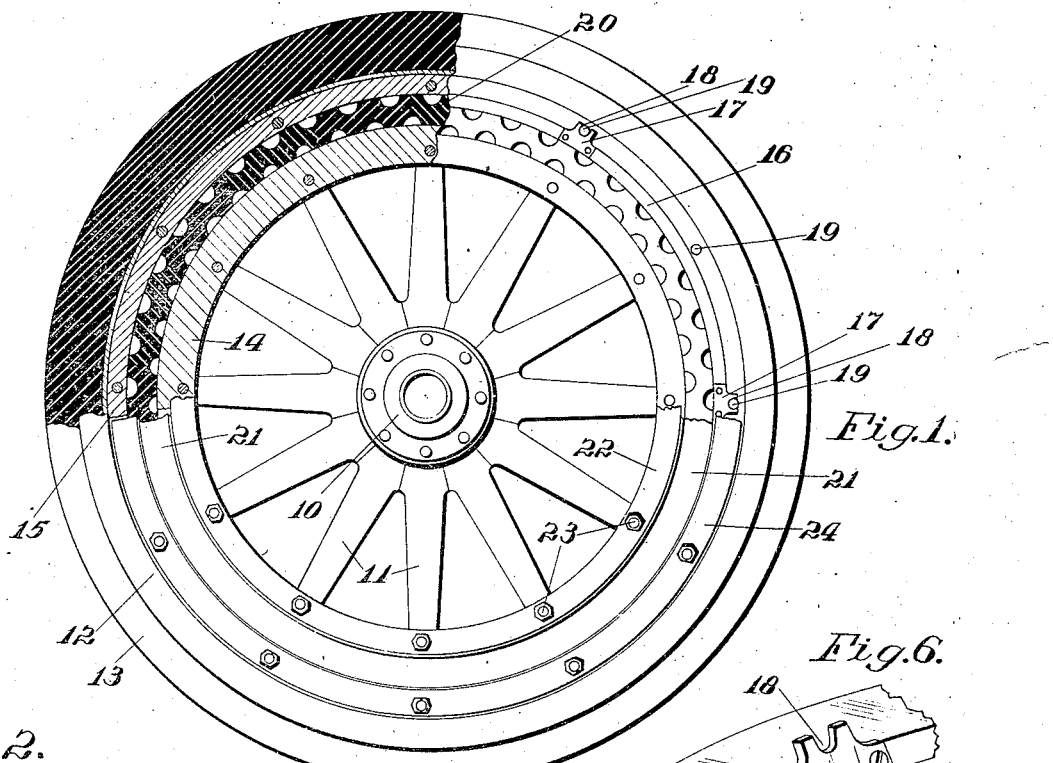
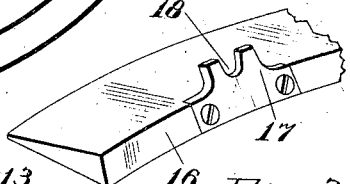
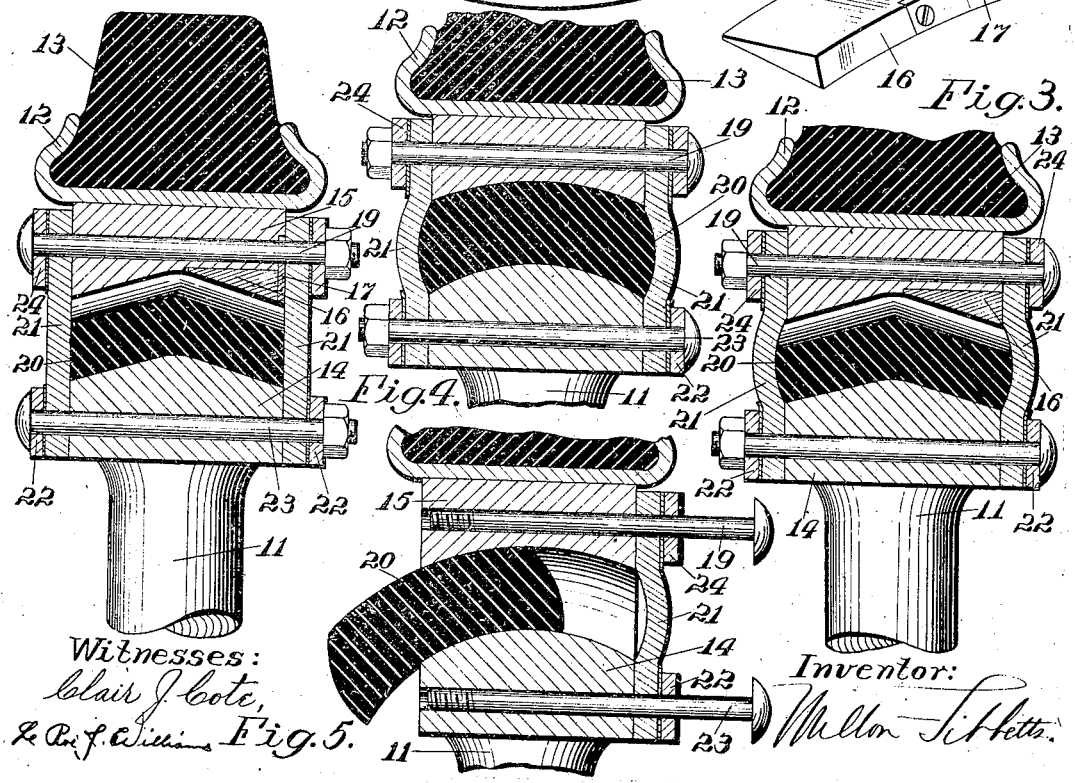
Witnesses:
Inventor:

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

VEHICLE-WHEEL.

1,330,222.

Specification of Letters Patent.  Patented Feb. 10, 1920.

Application filed October 21, 1914. Serial No. 867,839.

*To all whom it may concern:*

Be it known that I, MILTON TIBBETTS, a citizen of the United States, and resident of Detroit, Wayne county, State of Michigan, have invented certain new and useful Improvements in Vehicle-Wheels, of which the following is a specification.

This invention relates to vehicle wheels, and particularly to wheels for use on motor vehicles.

One of the objects of the present invention is to make a vehicle wheel with a cushioning element arranged adjacent its periphery and independent of the tire and to so connect the parts of the wheel separated by the cushioning element that the driving and side thrusts on the wheel will not injuriously separate them.

Other objects of the invention will appear from the following description taken in connection with the drawings, in which:

Figure 1 is a side elevation and part sectional view of a vehicle wheel made in accordance with this invention;

Fig. 2 is an enlarged transverse section through the outer portion of the wheel shown in Fig. 1;

Fig. 3 is a slightly modified form of the wheel shown in Figs. 1 and 2;

Fig. 4 is a transverse section showing another form of the invention;

Fig. 5 illustrates the assembly of the parts of the wheel shown in Fig. 4; and

Fig. 6 is a detail view of one end of the retaining ring.

Referring to the drawings, the wheel illustrated in Fig. 1 comprises a hub 10, spokes 11, and a rim 12, which supports the tire 13 of any suitable construction. The felly of this wheel however is of unusual construction, being formed of inner and outer felly members 14 and 15 respectively. The spokes 11 extend into and are secured to the inner felly member 14, and the members 14 and 15 are separated somewhat, thus forming an annular space between them. As shown, this space is irregular in cross section, the walls being inclined in cross section from the median plane toward both ends or sides of the space.

In Fig. 2, a section of one of the inclined walls of the annular space is formed by a detachable or removable ring 16, which is shown as wedge-shaped in cross section. Thus the ring, which is preferably a split ring, is readily fitted into the space to form one of the inclined walls as shown. This ring 16 may be provided at intervals along its edge with lugs 17 having U-shaped spaces 18 adapted to fit around the bolts 19 hereinafter more fully described, for the purpose of retaining the ring against circumferential movement on the felly member.

A cushioning element 20 is adapted to be inserted between the inner and outer felly members and practically fill the annular space referred to. This cushioning element is preferably formed in sections and may be of molded rubber. If desired, it may be corrugated as shown or other suitable forms may be used.

It will be understood that the rubber sections will be inserted in the annular space between the inner and outer felly members with the retaining ring 16 removed. The retaining ring is then pressed into place and the parts secured together as hereinafter described. It will be seen also that any side thrusts on the outer member relative to the inner member will cause a compression of one half or the other of the cushioning element, the latter thereby tending to prevent undue lateral movement of one of the felly members relative to the other.

For the purpose of closing the sides of the annular space and retaining the various parts in place, side covers 21 are provided, one for each side of the wheel. These side covers are preferably of rubber composition or rubber combined with fabric to give strength, and they are each secured to both the inner and the outer felly member. Inner securing strips 22 and bolts 23 secure the side covers to the inner felly member, and outer securing strips 24 and the bolts 19 above referred to secure the side covers to the outer felly member. It will be seen that these latter bolts also secure the retaining rings 16 in place.

In Fig. 3 a slight modification of the wheel shown in Figs. 1 and 2 is illustrated. In this form, the parts are all the same as in Fig. 2 except the cushioning member 20, which is shown as extending slightly beyond the ends of the annular space so that the middle portion of the side covers 21 is bulged outwardly somewhat. This insures a closer fit of the various parts and causes an outward bow of the side covers at all times, this assisting in prolonging their life.

In Figs. 4 and 5 the inner and outer walls of the annular space between the felly members are curved in cross section. The walls are shown as substantially concentric although they need not be exactly so. The rubber blocks composing the cushioning member are made with correspondingly curved opposite faces so that they may be inserted into the space as shown particularly in Fig. 5 where one of the blocks is illustrated as partly inserted. As shown, these blocks also extend slightly beyond the ends of the annular space as in the form shown in Fig. 3.

Other forms of the invention will readily suggest themselves to one skilled in the art, and the claims are understood as not limited to the exact forms of the invention herein shown.

Having thus described my invention, what I claim and desire to secure by Letters Patent is:—

1. In a vehicle wheel, the combination with inner and outer felly members separated to form an annular space between them, a cushioning element adapted to be inserted into said space from one side, a retaining ring coöperating with said cushioning element, and side covers secured to both of said felly members.

2. In a vehicle wheel, the combination with inner and outer felly members separated to form an annular space between them, a cushioning element adapted to be inserted into said space from one side, a retaining ring coöperating with said cushioning element and secured against circumferential movement on one of said felly members, and side covers over the sides of said spaces secured to both of said felly members.

3. In a vehicle wheel, the combination with inner and outer felly members separated to form an annular space between them, a detachable retaining ring forming an inclined wall for part of said space, a cushioning element adapted to be inserted in said space when the retaining ring is removed, and means for retaining said ring in place.

4. In a vehicle wheel, the combination with inner and outer felly members separated to form an annular space between them, a detachable retaining ring of wedge cross section forming a wall for part of said space, a cushioning element adapted to be inserted in said space when the retaining ring is removed, and means for retaining said ring in position.

In testimony whereof I affix my signature in the presence of two witnesses.

MILTON TIBBETTS.

Witnesses:
  LE ROI J. WILLIAMS,
  CLAIR J. COTE.